March 14, 1950  G. D. BEYETTE  2,500,239
SELECTIVE VALVE
Filed May 29, 1945

Inventor
GORDON D. BEYETTE,
Attorneys

Patented Mar. 14, 1950

2,500,239

UNITED STATES PATENT OFFICE 2,500,239

SELECTIVE VALVE

Gordon D. Beyette, West Haven, Conn.

Application May 29, 1945, Serial No. 596,526

1 Claim. (Cl. 277—59)

The present invention relates to new and useful improvements valves, and more particularly to a valve by means of which liquid may be selectively transferred from any one of a group of tanks or reservoirs to any one of a second group of tanks or reservoirs.

The invention is designed particularly for use in transferring ice cream mix, milk, or other liquids, from one group of tanks for distribution in another group of tanks, and embodying means whereby the liquid from any one of the first group of tanks may be selected and transferred to any one or more of the second group of tanks.

More specifically, the invention embodies a valve structure including a valve housing and having a plurality of intake ports with a manually operable valve therein to control the admission of liquid into the housing from any one of said intake ports together with at least one outlet port leading from the housing.

A further object of the invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
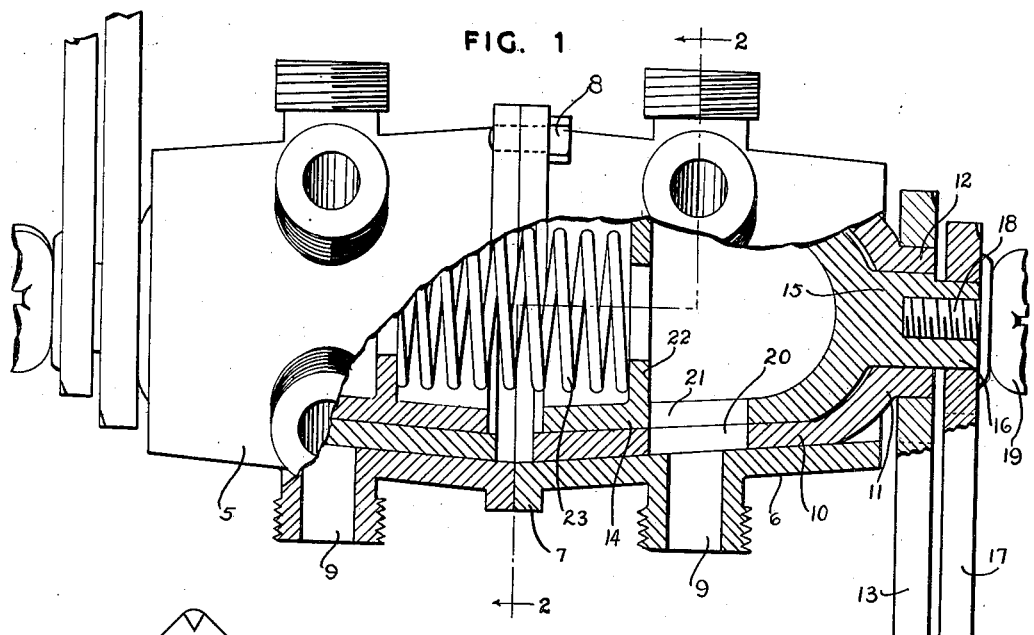
Figure 1 is a side elevational view with parts broken away and shown in section.
Figure 3:
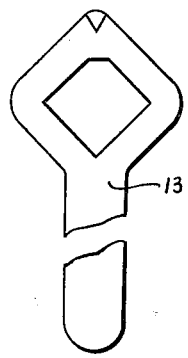
Figure 3 is a view in elevation of one of the wrenches for manipulating the valve.
Figure 2:
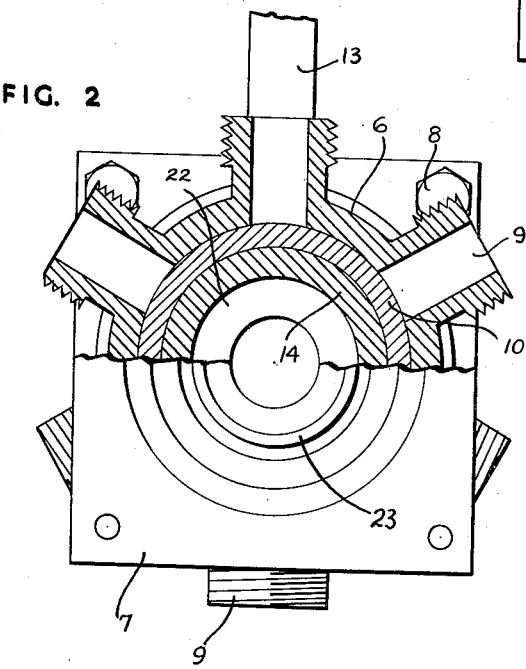
Figure 2 is a transverse sectional view taken substantially on a line 2—2 of Figure 1.

Referring now to the drawing in detail, and first with respect to the form of the invention shown in Figures 1 to 3, inclusive, the numerals 5 and 6 designate a pair of duplicate valve housings or bodies of tapering hollow constructions open at each end and formed at their larger ends with flanges 7 for connecting the valve housings to each other in end-to-end relation by means of bolts or the like 8.

The sides of the valve housings are each formed with a plurality of threaded nipples 9 to each of which pipes may be connected leading to individual tanks or reservoirs (not shown).

A conical valve element 10 is rotatably mounted in each of the valve housings, the valve being open at each end and formed with a neck 11 at its smaller end projecting outwardly through the smaller end of the housing. The outer end of the neck 11 is squared, as shown at 12, to receive a wrench 13.

A conical member 14 is rotatably mounted in the valve 10, the larger end of the conical member being open and the smaller end being closed and formed with a stem 15 rotatably mounted in the neck 11 of the valve and projecting outwardly therefrom and formed with a squared end 16 also adapted to receive a wrench 17.

A bolt 18 is threaded in the outer end of the stem 15 and formed with a wing head 19 for securing the wrenches 13 and 17 in position on the squared outer ends of the valve 10 and conical member 14, respectively.

One side of the valve 10 and conical member 14 is formed with registering openings 20 and 21, respectively, adapted for registering with each other and also for registering with any one of the nipples 9.

The conical member 14 adjacent its larger end is formed with an internal flange 22 against which one end of a coil spring 23 is engaged.

The conical members and valves in the respective housings 5 and 6 are of duplicate construction and the larger ends of the conical members and valves are arranged adjacent to each other and with the opposite ends of the coil spring 23 bearing against the flanges 22 of the respective elements, as indicated in Figure 1 of the drawing. The coil spring 23 maintains the valves 10 and conical members 14 in sealed fitting engagement with the walls of the housings and with each other.

In the operation of the device, by connecting the nipples 9 of the valve housing 5 with one group of tanks or reservoirs and connecting the nipples of the valve housing 6 with another group of tanks or reservoirs, the valves 10 and conical members 14 may be manipulated by the wrenches attached thereto to selectively admit liquid from any one of one group of tanks for transferring to any one of the second group of tanks. With the nipples 9 on one side of the center of the valve connected to a plurality of tanks on one floor and with corresponding nipples connected to a plurality of tanks on a floor below, the conical member 14 in the center may be set by the wrench 17 with the opening 21 therein registering with one of the nipples 9 that is connected to a tank from which it is desired to draw a liquid or to which it is desired to run a liquid. The valve member 10 may then be turned by the wrench 13 until the opening 20 therein registers with the openings 21 and 9. It is, therefore, possible to set the opening 21 to register with a nipple associated with a tank and open and close the opening by the valve member without moving the opening in the central member. When all of the liquid is exhausted from one tank, the opening 21 may be turned to register with a nipple of another tank, and then while in this position the valve member may be turned to open and close the opening as may be desired.

The wrenches 13 and 17 are preferably arranged with their edges in longitudinal alignment when the openings 20 and 21 are in registry and when it is desired to move one of said openings out of registry to close communication through any of their associated nipples, the wrenches are moved out of alignment or parallelism with each other.

Figure 4:
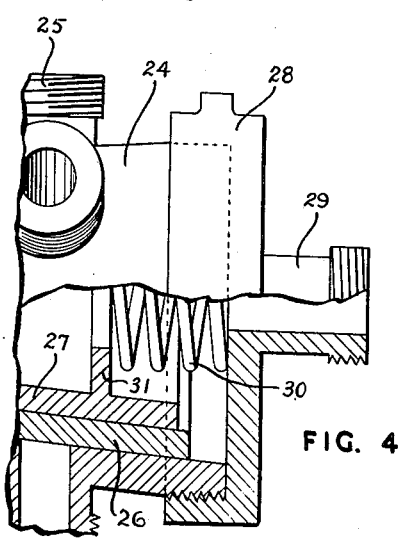
Figure 4 is a fragmentary side elevational view with parts shown in section of a modified valve construction.

In Figure 4 of the drawing a single valve housing 24 is provided formed with a plurality of threaded nipples 25 and provided with a sleeve 26 and valve 27 as heretofore described, the larger end of the valve housing being closed by a cap 28 formed with a single threaded nipple 29. The coil spring 30 is positioned between the cap 28 and the flange 31 of the valve.

In this form of the invention, the nipples 25 may be connected to a group of tanks (not shown), while the nipple 29 is also connected to a tank (not shown), the nipples 25 constituting intake ports by means of which liquid from the tanks attached thereto may be selectively transferred to the tank attached to the nipple 29.

It is believed that the details of construction, manner of use and advantages of the device will be readily understood from the foregoing without further detailed explanation.

It is to be understood, however, that even though I have herein shown and described preferred embodiments of my invention, the same is susceptible to further changes fully comprehended by the spirit of the invention as herein described, and the scope of the appended claim.

Having thus described the invention, what I claim is:

In a multi-way valve having oppositely-positioned conically-shaped casings each formed with a plurality of radially-disposed nipples providing connections communicating with a common central chamber, a pair of conically-shaped hollow valves rotatably mounted in said casing in base-to-base relation, said valves each having an aperture formed through the walls thereof, said apertures being selectively registrable with said nipples to open and close the same, a hollow inner conical member rotatable in each of said valves, said members being formed with apertures therethrough formed to register with said apertures in said valves and with said nipples, said inner conical members each having a radially inwardly-directed annular web, the webs of said members being axially spaced, an expansive spring interposed between said webs whereby to load said conical members in said valves in opposite directions into engagement with said casings, means for independently actuating each valve and conical member, said means including handles adapted to be aligned with the apertures of said valves and conical members registered, whereby to selectively open and close selected nipples of each casing.

GORDON D. BEYETTE.

REFERENCES CITED

The following references are of record in the file of this patent:

UNITED STATES PATENTS

| Number | Name | Date |
| --- | --- | --- |
| 1,489,396 | Odum | Apr. 8, 1924 |
| 1,559,585 | Peterson | Nov. 3, 1925 |
| 1,566,605 | Jamieson | Dec. 22, 1925 |

FOREIGN PATENTS

| Number | Country | Date |
| --- | --- | --- |
| 403,379 | Great Britain | of 1933 |
| 747,585 | France | Apr. 4, 1933 |